United States Patent [19]

Chadwick

[11] 4,417,841
[45] Nov. 29, 1983

[54] LOADER AND TRANSPORTER

[75] Inventor: James B. Chadwick, Geebung, Australia

[73] Assignee: Hydraulics & Fabrications Pty. Ltd., Queensland, Australia

[21] Appl. No.: 283,339

[22] Filed: Jul. 14, 1981

[30] Foreign Application Priority Data

Jul. 30, 1980 [AU] Australia .............................. PE4769

[51] Int. Cl.³ .......................... B60P 1/18; B60P 1/30; B60P 1/36
[52] U.S. Cl. .................................. 414/346; 280/43.23; 414/345; 414/347; 414/471; 414/476; 414/483; 414/491; 414/495
[58] Field of Search .............................. 414/345–347, 414/471, 474, 476, 482–485, 491, 492, 495, 497, 528; 280/43.23

[56] References Cited

U.S. PATENT DOCUMENTS 3,288,315 11/1966 Bigden .............................. 414/483 X
3,623,617 11/1971 Nemessanyi ..................... 414/495 X
3,889,832 6/1975 Hanson ................................ 414/497

Primary Examiner—Robert G. Sheridan
Attorney, Agent, or Firm—D. Paul Weaver

[57] ABSTRACT

A loader and transporter for large loads such as cotton modules has a wheel-mounted main frame, which may be self-propelled or of tractor-drawn trailer type, a deck, incorporating a reversible longitudinal conveyor, being connected by a transverse pivotal connection to the main frame. Lifting means are provided for raising and lowering this pivotal connection and the deck and tilting means are provided for tilting the deck so that, when the deck is lowered, it can be tilted from a substantially horizontal low-load travelling position to a position for loading from ground level, and when the deck is raised, it can be tilted from a substantially horizontal high-load travelling position to a position for unloading onto a semi-trailer, for example.

11 Claims, 8 Drawing Figures

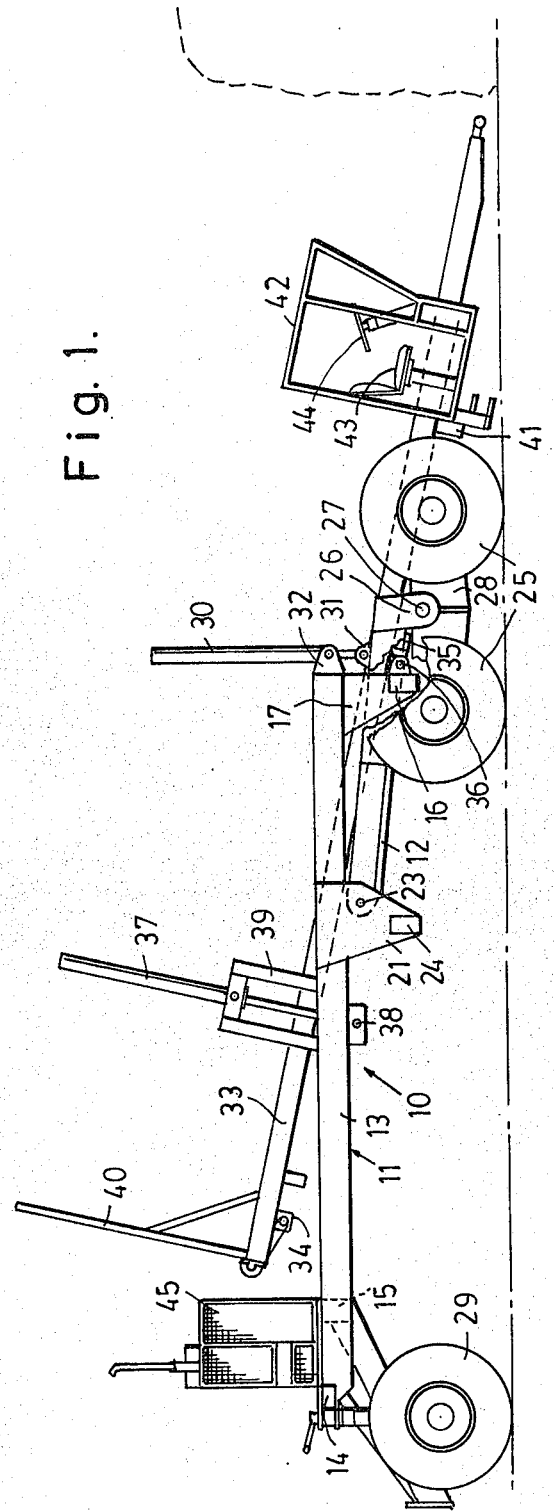

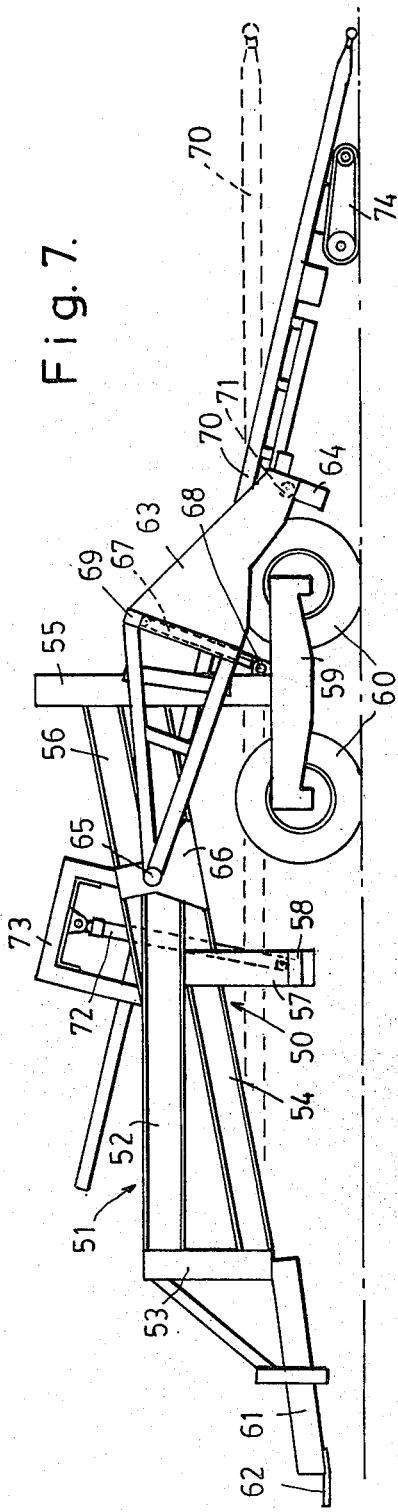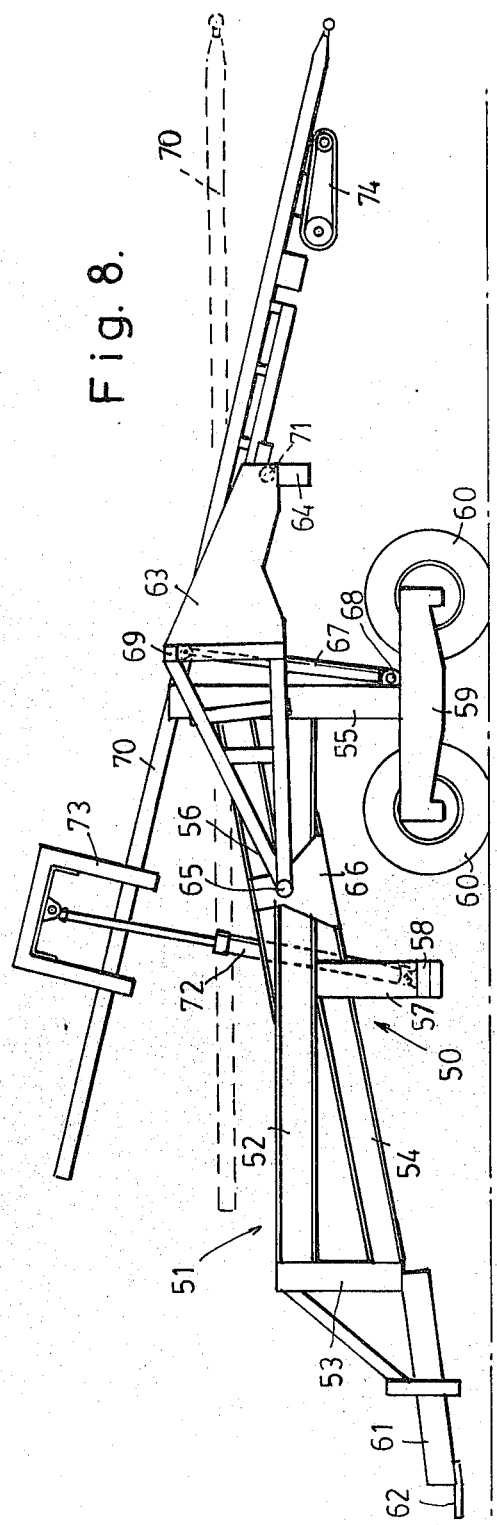

LOADER AND TRANSPORTER

BACKGROUND OF THE INVENTION

This invention relates to a loader and transporter.

Cotton is delivered from harvesters into module formers, in which the cotton is compressed before being discharged onto the ground as large more or less rectangular modules, which must subsequently be picked up and transported to a cotton gin. The transporting is normally done by cotton module transporters, such a vehicle being made to load a module on a chain bed which is tiltable for this purpose and is moved under the module as its chains are operated to convey the module fully onto the chain bed, after which the chain bed is brought to horizontal transporting position.

Newly developed cotton growing areas are often remote from cotton gins, so that the modules have to be transported for long distances. Although the existing transporters are capable of this, it is clearly advantageous to be able to use conventional semi-trailer vehicles, as well as, or instead of, the more complex and expensive module transporters, for these long hauls.

The general object of the present invention is to provide a loader, capable of picking up a large load such as a cotton module, and transporting it to, and loading it onto, for example, a conventional large semi-trailer transport vehicle.

BRIEF DESCRIPTION OF THE INVENTION

According to the present invention, a loader and transporter, particularly for loading, transporting and unloading cotton modules has a wheel-mounted main frame, and a deck which incorporates a reversible longitudinal conveyor, a pivotal connection transverse of the deck and the main frame connecting the two. This pivotal connection may be raised and lowered by suitable hydraulic or other means to raise the deck relative to the main frame. Suitable means are provided for tilting the deck relative to the main frame so that when the deck is in lowered position, it may be brought from a substantially horizontal low travelling position to a tilted loading position for loading from ground level, and when the deck is raised, it may be brought from a substantially horizontal high travelling position to a tilted unloading position, for unloading onto a semi-trailer, for example. The transporter and loader may be either of self-propelled or tractor-drawn trailed type.

BRIEF DESCRIPTION OF THE DRAWINGS

In the drawings:

FIG. 1 is a side view of a self-propelled loader and transporter according to the invention approaching and about to load a cotton module indicated in broken outline.

FIG. 7 is a side view of a tractor-drawn loader and transporter according to an alternative embodiment of the invention in loading arrangement, the transporting position of its bed being shown in broken outline, and FIG. 8 is a side view of the apparatus shown in FIG. 7 in lifted-load position, the unloading position of its bed being indicated in broken outline.

DETAILED DESCRIPTION OF THE PREFERRED EMBODIMENTS

Figure 6:
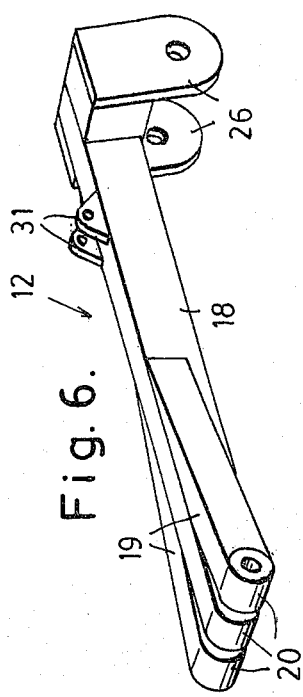
FIG. 6 is a perspective view of a part of the loader and transporter.
Figure 5:
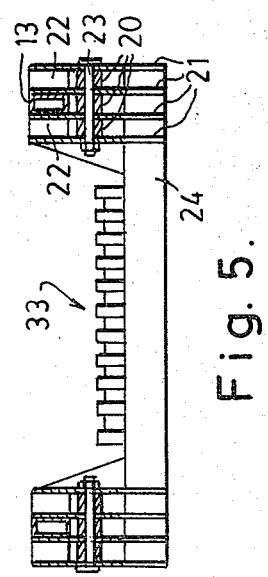
FIG. 5 is a sectional view, to larger scale, along line 5—5 in FIG. 2.

Referring initially to FIGS. 1 to 6 inclusive, the self-propelled loader and transporter includes an articulated main frame assembly indicated generally at 10, and consisting of a rectangular main chassis 11 and a pair of suspension arms 12. The main chassis has a pair of parallel box-section side members 13 rigidly interconnected by rear cross-members 14 and 15 and a front cross-member 16 secured between a pair of brackets 17 depending from the front of the side members 13. Each suspension arm 12, as shown particularly in FIGS. 5 and 6, includes a central main arm 18 to which are secured two rearwardly divergent secondary arms 19, the three carrying at the rear three spaced axially aligned knuckles 20 interposed between four parallel pivot plates 21 depending from a main chassis side member 13 and spaced apart by the side member and by spacers 22. The suspension arm knuckle 20 are pivoted between plates 21 by a pivot 23, and the plates 21 depending from both side members 13 are interconnected by an intermediate cross-member 24.

The main frame 10 is supported in front by two pairs of bogy-mounted drive wheels 25, a pair of apertured lugs 26 secured to and extending down from the front of each suspension arm 12 being pivoted at 27 to a bogy frame 28. Each of the drive wheels is powered by a hydrostatic motor of known type forming the hub of the wheel. At the rear, the main frame 10 is supported on a pair of independently mounted steerable rear wheels 29.

The front drive wheels 25 are fitted with brakes, the steerable rear wheels 29 are not.

The front of the main chassis 11 may be raised or lowered by a pair of hydraulic rams 30, each with its piston pivoted between a pair of lugs 31 on a suspension arm 12, its cylinder being trunnion-mounted between a pair of lugs 32 at one side of the front of the main chassis.

A tilting chain deck 33 is provided about a transverse axis to the main chassis 10. This deck is of known type comprising a rectangular frame with a series of hollow steel boxes between its sides to carry a number of endless conveyor chains, with attachments to grip a cotton module, engaged on drive sprockets, driven by a hydraulic motor 34, at the rear of the deck, and idler sprockets at the front. A cross-member 35 of the deck 33 is pivoted at 36 to the front cross-member 16 of the main chassis 11, and the deck may be tilted relative to the main frame assembly 10 by a pair of hydraulic rams 37 each with its piston pivoted at 38 to a side member 13 of the main chassis 11, its cylinder being trunnion-mounted in a bracket 39 mounted on the corresponding side of the chain deck 33.

A stop frame 40 extends upwardly from the rear of the chain deck 33. A cross member 41 towards the front of the deck extends beyond one side thereof to support an operator's cabin 42 containing an operator's seat 43, a steering wheel 44 for control of hydraulic steering means for the back wheels, controls for a motor 45 on the back of the main frame assembly 10 driving the pump of the hydraulic system of the apparatus, and controls for all the hydraulic and other working parts of the apparatus.

Figure 2:
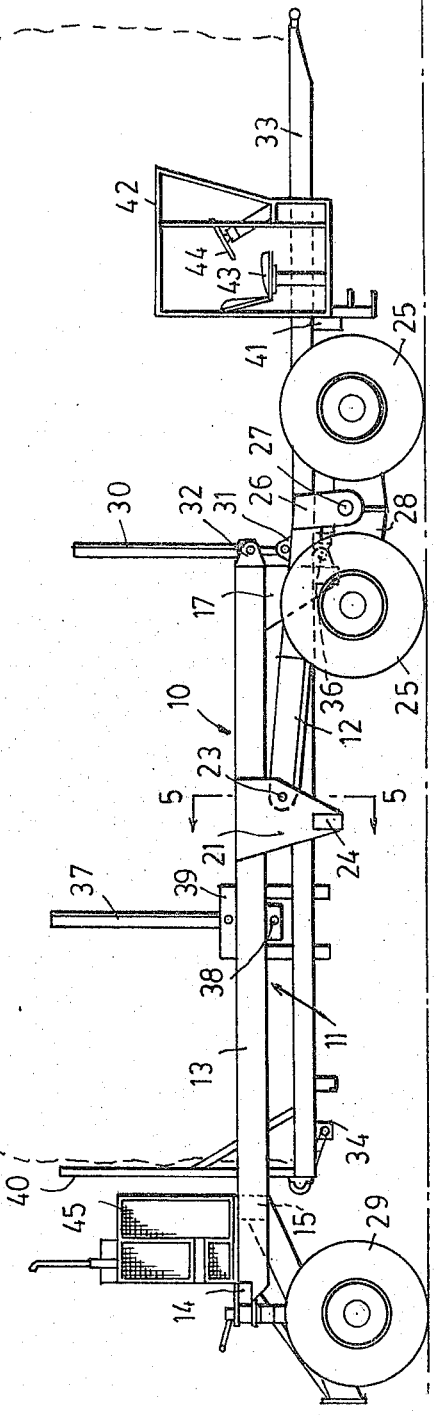
FIG. 2 is a similar view of the loader and transporter with the module loaded for transport.

The loader and transporter, during normal travelling, has its parts arranged as shown in FIG. 2, the rams 30 and 37 fully retracted, the main chassis 11 and the chain deck 33 being horizontal.

Figure 3:
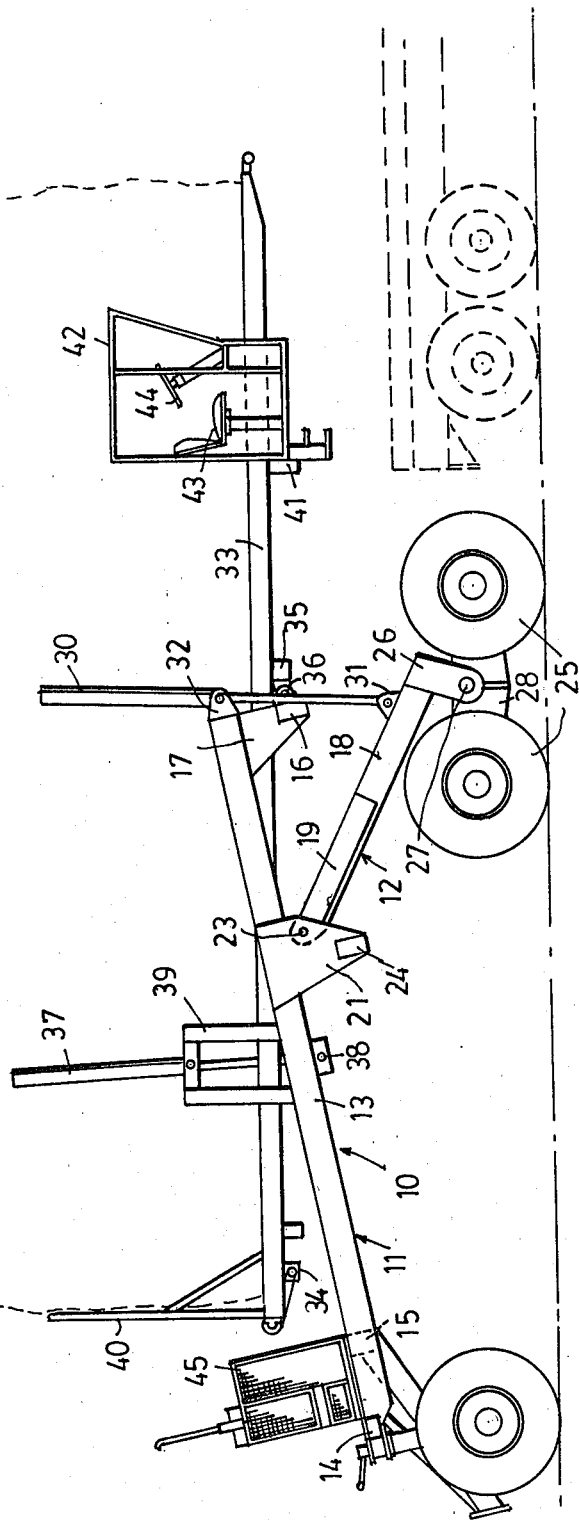
FIG. 3 is a similar view of the loader and transporter with the module raised and being brought over a semi-trailer, indicated in broken outline.
Figure 4:
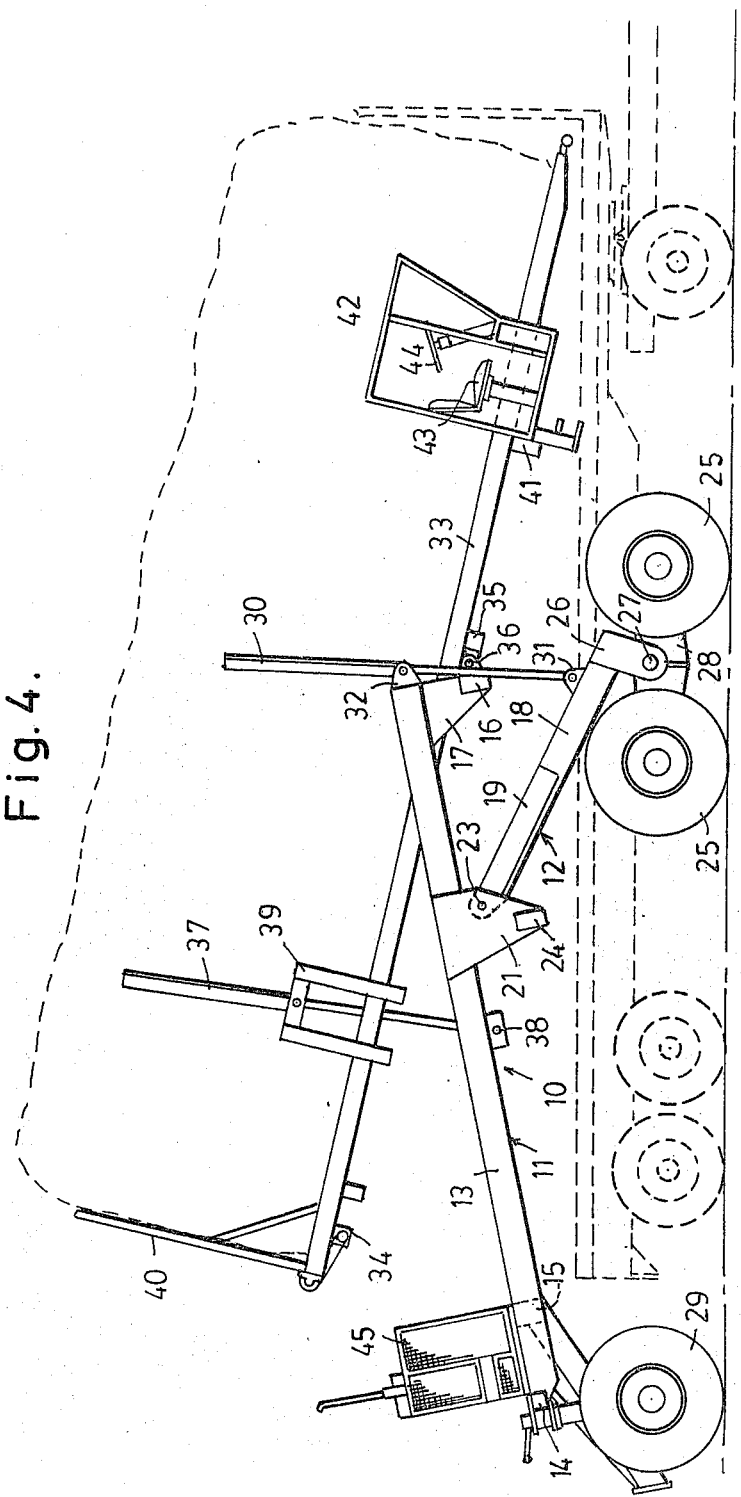
FIG. 4 is a similar view of the loader and transporter at the commencement of unloading onto the semi-trailer.

When the apparatus is to pick up a cotton module, indicated in broken outline at 46, and to load it onto a flat-deck semi-trailer, part of which is indicated in broken outline at 47 in FIGS. 3 and 4, the chain deck is tilted down at the front, as shown in FIG. 1, by extending the rams 37, and the loader is driven towards the module, the leading end of the chain deck on or near to the ground and its chains being driven towards the rear at the same speed as the loader is moved forwards. The module is thus loaded onto the chain deck 33, the operation of the conveyor chains being stopped, and the chain deck 33 being brought to horizontal, as shown in FIG. 2, by retracting the rams 37.

The loader and transporter is then driven to the semi-trailer and, when nearing it, the rams 30 and the rams 37 are extended to raise the chain deck 33 and the module 46 to the high-load position shown in FIG. 3, the chain deck 33 being maintained horizontal. The apparatus is advanced to straddle the semi-trailer and, when the module 46 is brought fully over the deck of the semi-trailer, the rams 37 are further extended to tilt the chain deck, bringing its front down onto or near to the front of the semi-trailer's deck, as shown in FIG. 4. The hydraulic motor 34 is operated to move the chains of the chain deck from rear to front and at the same time the loader and transporter is moved in reverse at the same speed so that the module 46 is unloaded onto the semi-trailer flat-deck. The apparatus may then be returned to its normal travelling position shown in FIG. 2 by fully retracting the rams 30 and 37.

The tractor-drawn modification of the invention shown in FIGS. 7 and 8 has a main frame assembly 50 including a main chassis 51 having a pair of longitudinal members 52 fixed in front to a front frame 53 and braced thereto by oblique members 54, and fixed in front to a pair of standards 55 and braced thereto by oblique members 56. A pair of hangers 57 rigidly secured to and extending down from the longitudinal members 52 are interconnected at the bottom by a cross-member 58. Each of the standards 55 is fixed to a bogy frame 59 mounted on a pair of wheels 60 in tandem, and a drawbar 61 extending from the front frame 53 is provided with a hitch 62 for connection to a tractor.

A pair of suspension arms 63 are rigidly interconnected at their rear ends by a cross-member 64, and the front end of each is pivoted at 65 to a pair of bearing plates 66 secured to each side of the main chassis 51. The two suspension frames may be raised or lowered by a pair of hydraulic rams 67, each with its cylinder pivoted at 68 to the lower part of a standard 55 and its piston pivoted to a cross-member 69 interconnecting the top middle parts of the two suspension arms.

A chain deck 70, generally as before described with reference to the embodiment shown in FIGS. 1 to 6, is pivoted at 71 to the cross-member 64 between the rear ends of the two suspension arms 63, and may be tilted about its pivot by a pair of hydraulic rams 72, each with its cylinder pivoted to the cross-member 58 between the hangers 57, and with its piston pivoted to a bracket 73 fixed to a side of the chain deck 70.

A number of adjacent similar hydraulically driven reversible crawler-track units 74 are mounted under the rear part of the chain deck 70 in such manner than when the chain deck is tilted to bring its rear end down near to the ground, the crawler-track units will be brought down to ground level.

In FIG. 7, the normal low-load travelling position of the chain deck 70 is shown in broken outline, its loading position, tilted by the rams 72 to bring the crawler-track units 74 down to the ground, being shown in full outline. In picking up a cotton module, the tractor's gearbox is in neutral, and the crawler-track units are driven to cause the apparatus to be moved rearwardly, and simultaneously the chains of the chain deck are operated, the chain deck being moved under the module, which is drawn up onto the chain deck. When the module is fully loaded, the chain deck is brought to its normal low-load travelling position and the apparatus is hauled towards a semi-trailer. The chain deck 70 is raised, by extending both pairs of rams 67 and 72, to its horizontal high-load travelling position shown in broken outline in FIG. 8, and the loader and transporter is backed by the tractor to straddle the flat deck of the semi-trailer. The chain deck 70 is then tilted, by further extending the rams 72, to bring it to the unloading position shown in full outline in FIG. 8, the crawler-track units 74 then being brought down onto the front part of the semi-trailer deck. With the tractor's gearbox in neutral, the conveyor chains of the chain deck and crawler-track units are driven to move the chain deck forwards at the same speed as the module is fed from the back of the chain deck onto the semi-trailer flat-bed. The chain deck 70 is then lowered to its normal lowered travelling position and the loader and transporter is hauled away.

We claim:

1. A loader and transporter comprising a wheel mounted main frame, a deck, a reversible longitudinal conveyor on the deck, a pivotal connection transversely of and connecting the deck and main frame, lifting means for raising and lowering the pivotal connection and deck relative to the main frame, tilting means for tilting the deck on the axis of the pivotal connection relative to the main frame when the deck is either lowered to bring it from a substantially horizontal low traveling position to a tilted loading position, or raised to bring it from a substantially horizontal high traveling position to a tilted unloading position, and the wheel mounted main frame including a rear chassis portion supported at its rear end on steerable wheels, and a pair of forward suspension arms pivoted at their rear ends about a transverse axis to said rear chassis portion and pivoted about transverse axes at their forward ends to a pair of laterally spaced drive wheel assemblies, said pivotal connection of the deck to the wheel mounted main frame being disposed substantially at the front of the rear chassis portion.

2. A loader and transporter according to claim 1 wherein:
   the tilting means includes hydraulic rams connected between the wheel mounted main frame and the deck, and
   the lifting means includes a pair of hydraulic rams each connected between the suspension arms and the rear chassis portion.

3. A loader and transporter according to claim 2 wherein:
   a motor for driving the working parts is mounted on the wheel mounted main frame, and an operator's cabin is mounted on the front part of the deck.

4. A loader and transporter as defined in claim 1, and the lateral spacing of said drive wheel assemblies and suspension arms being sufficient to enable the drive wheel assemblies and suspension arms to straddle the opposite sides of a conventional flat bed trailer during delivery of a load thereto by the loader and transporter while said pivotal connection and deck are raised relative to the wheel mounted main frame.

5. A loader and transporter comprising a wheel mounted main frame, a deck, a reversible longitudinal conveyor on the deck, a pivotal connection transversely of and connecting the deck and wheel mounted main frame, lifting means for raising and lowering the pivotal connection and deck relative to the wheel mounted main frame, tilting means for tilting the deck relative to the wheel mounted main frame when the deck is either lowered to bring it from a substantially horizontal low traveling position to a tilted loading position, or raised to bring it from a substantially horizontal high traveling position to a tilted unloading position, and the wheel mounted main frame including a main chassis portion having at its front a hitch for connection to a towing vehicle and being supported at its rear on a pair of laterally spaced trailer wheel assemblies, and the wheel mounted main frame further including a pair of suspension arms having forward ends pivotally connected about a transverse axis to said main chassis portion, the pivotal connection of the deck to the wheel mounted main frame being substantially at the rear of said suspension arms.

6. A loader and transporter according to claim 5 wherein:
the lifting means include a pair of hydraulic rams each connected to the main chassis portion and the suspension arms, and
a reversible driven crawler track unit mounted below the rear end of the deck.

7. A loader and transporter as defined in claim 5, and the lateral spacing of the trailer wheel assemblies being sufficiently great to enable longitudinal straddling of a standard flat bed trailer by said wheel assemblies during the delivery of a load to such trailer by the loader and transporter.

8. A loader and transporter for cotton modules and the like adapted to straddle a standard flat bed trailer during delivery of a module from the loader and transporter to the trailer, said loader and transporter comprising an articulated wheel mounted main frame having a transverse articulation axis, at least one end portion of said main frame on one side of the transverse articulation axis being divided to enable straddling of a standard flat bed trailer, a deck pivotally mounted on one end portion of the articulated main frame on a second parallel transverse articulation axis spaced from the first-named articulation axis, a reversible longitudinal conveyor means on said deck, generally upright axis means to elevate and lower said deck with relation to the articulated main frame, and generally upright axis means for tilting said deck with relation to the articulated main frame and being spaced longitudinally of the deck and main frame from said means to elevate and lower said deck.

9. A loader and transporter for cotton modules and the like as defined in claim 8, and said means to elevate and lower said deck comprising a laterally spaced pair of power rams connected between the articulated portions of the main frame.

10. A loader and transporter for cotton modules and the like as defined in claim 9, and said deck being pivotally mounted on the portion of the articulated main frame which is nearest to said upright axis means to elevate and lower said deck.

11. A loader and transporter for cotton modules and the like as defined in claim 8, and the transverse articulation axis of the articulated wheel mounted main frame being located intermediate the opposite ends of the main frame and being located between the ends of one articulated portion of the main frame and at one end of the other articulated portion of the main frame.

* * * * *